(12) United States Patent
Gardiner et al.

(10) Patent No.: US 9,092,888 B1
(45) Date of Patent: Jul. 28, 2015

(54) VOLUME RENDERING A GRAPHICAL 3D SCENE CONTAINING A 3D VOLUMETRIC OBJECT AND ATMOSPHERIC EFFECTS

(71) Applicants: Harold Dee Gardiner, Sandy, UT (US); Thomas Peter Skowyra, Salt Lake City, UT (US); Raymond Lee Fitzgerald, Keller, TX (US); Seth John Thorup, Sandy, UT (US)

(72) Inventors: Harold Dee Gardiner, Sandy, UT (US); Thomas Peter Skowyra, Salt Lake City, UT (US); Raymond Lee Fitzgerald, Keller, TX (US); Seth John Thorup, Sandy, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 369 days.

(21) Appl. No.: 13/629,230

(22) Filed: Sep. 27, 2012

(51) Int. Cl.
*G06T 17/00* (2006.01)
*G06T 19/00* (2011.01)

(52) U.S. Cl.
CPC ............... *G06T 17/00* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 6,184,857 B1 | 2/2001 | Latham | |
| 6,940,504 B1 * | 9/2005 | Mech et al. | 345/419 |
| 7,348,977 B2 * | 3/2008 | West et al. | 345/426 |
| 7,710,416 B2 | 5/2010 | Gardiner et al. | |
| 2001/0055026 A1 * | 12/2001 | Cosman et al. | 345/611 |
| 2003/0228052 A1 * | 12/2003 | Yamaguchi | 382/154 |
| 2004/0125103 A1 * | 7/2004 | Kaufman et al. | 345/419 |

OTHER PUBLICATIONS

Bess, et al., "Battlefield Smoke—A New Dimension in Networked Simulation," I/ITSEC Conference Proceedings, 1991, pp. 256-261.
http://en.wikipedia.org/wiki/Shadow_volume, "Shadow Volume," Wikipedia.org, retrieved Dec. 18, 2012, 7 pages.
Huang, et al., "Study and Implement About Rendering of Clouds in Flight Simulation," Audio, Language and Image Processing, Jul. 2008, pp. 1250-1254.
Kajiya, et al., "Ray Tracing Volume Densities," Computer Graphics, vol. 18, No. 3, Jul. 1984, pp. 165-174.

* cited by examiner

*Primary Examiner* — Edward Martello
(74) *Attorney, Agent, or Firm* — Angel N. Gerdzhikov; Donna P. Suchy; Daniel M. Barbieri

(57) ABSTRACT

A computerized method and system of rendering a graphical image containing a volumetric object on an electronic display is provided. The method includes defining, at a processing circuit, the volumetric object as a volume. The volume comprises a plurality of polygons. The method includes rendering the volume for a first plurality of pixels of the electronic display. The volume is described by volume characteristics. The method includes rendering a graphical image for a second plurality of pixels of the electronic display. The graphical image is described by global characteristics. When a view ray for at least one of the second plurality of pixels intersects at least one of the first plurality of pixels, the global characteristics and a proportion of the volume characteristics are combined when rendering the graphical image. The proportion is defined by an extent of the intersection of the view ray.

20 Claims, 11 Drawing Sheets

VOLUME RENDERING A GRAPHICAL 3D SCENE CONTAINING A 3D VOLUMETRIC OBJECT AND ATMOSPHERIC EFFECTS

BACKGROUND OF THE INVENTION

Simulating weather effects (e.g., a rain squall underneath a heavy cloud layer) is challenging with traditional polygon-based graphics systems. Also, polygon-based graphics systems do not always work well for other volumetric obscurants such as dust, smoke, clouds, and fog. Simulation of regional weather effects has been a long-term challenge for flight simulation.

For example, in a flight simulation system, if a pilot flies through a cloud, the polygonal construct often provides unrealistic cues which may negatively impact training. For example, a rain squall may be modeled with a set of textured polygons. As the pilot flies into the squall, the run-time software could decrease the visibility of the scene to simulate the fact that the pilot is now inside a region of lower visibility. This technique may have less-than-satisfactory results. As the global fog density is increased, it reduces the clarity of the entire scene—not just that which lies within the rain squall. Some objects may be more visible than they should, while other objects become less visible than they should. This may lead to false visual cues which may negatively impact training value.

Therefore, there is a need for an object rendering system and method that more accurately represents regional and/or volumetric objects. There is also a need to provide more realistic representations while maintaining control over the regional object's appearance.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One embodiment of the invention relates to a computerized method of rendering a graphical image containing a volumetric object on an electronic display. The method includes defining, at a processing circuit, the volumetric object as a volume. The volume comprises a plurality of polygons. The method includes rendering the volume for a first plurality of pixels of the electronic display. The volume is described by volume characteristics. The method includes rendering a graphical image for a second plurality of pixels of the electronic display. The graphical image is described by global characteristics. When a view ray for at least one of the second plurality of pixels intersects at least one of the first plurality of pixels, the global characteristics and a proportion of the volume characteristics are combined when rendering the graphical image. The proportion is defined by an extent of the intersection of the view ray.

Another embodiment of the invention relates to a system for rendering a graphical image containing a volumetric object on an electronic display. The system includes a processing circuit configured to define the object as a volume. The volume comprises a plurality of polygons. The processing circuit is further configured to render the volume for a first plurality of pixels of the electronic display. The volume is described by first characteristics. The processing circuit is further configured to render a graphical image for a second plurality of pixels of the electronic display. The graphical image is described by second characteristics. When a ray for at least one of the second plurality of pixels intersects at least one of the first plurality of pixels, the second characteristics and a proportion of the first characteristics are combined when providing the graphical image. The proportion is defined by an extent of the intersection of the ray.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

In one or more embodiments of the present disclosure, polygon-based volumes are implemented for display in frames on a display device depicting visual scenes. This may advantageously enable a modeler to define the volume's overall shape and appearance. In one or more embodiments, the volume may be modeled as a set of polygons that define a convex hull. The convex hull may have an exterior surface and an interior surface. In one or more embodiments, the volume may be used advantageously to simulate multiple volumetrictype obscurants, e.g., fog, dust, smoke, trees, bushes, etc. In one or more embodiments, the volume-defining polygons use characteristics (e.g., texture, color, etc.) to control the visual appearance of the outside and/or inside of the volume.

In one or more embodiments, as the volume-defining polygons are rendered, the attributes for each pixel are recorded in dedicated volume buffers. The buffers may store the distance to the front of the volume (entry) for each pixel, the distance to the back of the volume (exit) for each pixel, the visibility attributes defined within the volume, etc. In one or more embodiments, if the scene contains more than one volume, a separate buffer may be used to store each volume when the volumes are at different depths. If the volumes are at the same depth and do not intersect, the volumes may be stored in the same buffer. If the volumes are at the same depth and intersect, the volumes may define a concave shape, and the processing logic described herein may account for the concave shape.

In one or more embodiments, after the volume defining polygons are rendered into the special buffers, the normal visual scene is be rendered. As each object in the scene is rendered, each pixel's view ray may be tested against the volumes previously stored. If a view ray intersects the volume, the volume's visibility characteristics are applied to the portion of the view ray that is inside the volume, while the entirety of the view ray gets the global visibility effects. This may advantageously result in a more accurate representation of regional volume (e.g., weather) effects. For example, in one or more embodiments, the polygon structure may be less obvious due to the fog fading near the edges of a volume where the view ray travels a shorter distance through the volume. Also, this may advantageously and accurately account for objects within the volume and/or the viewer's position when entering and exiting the volume. For example, objects inside and outside the volume may appear more realistically.

Figure 1:
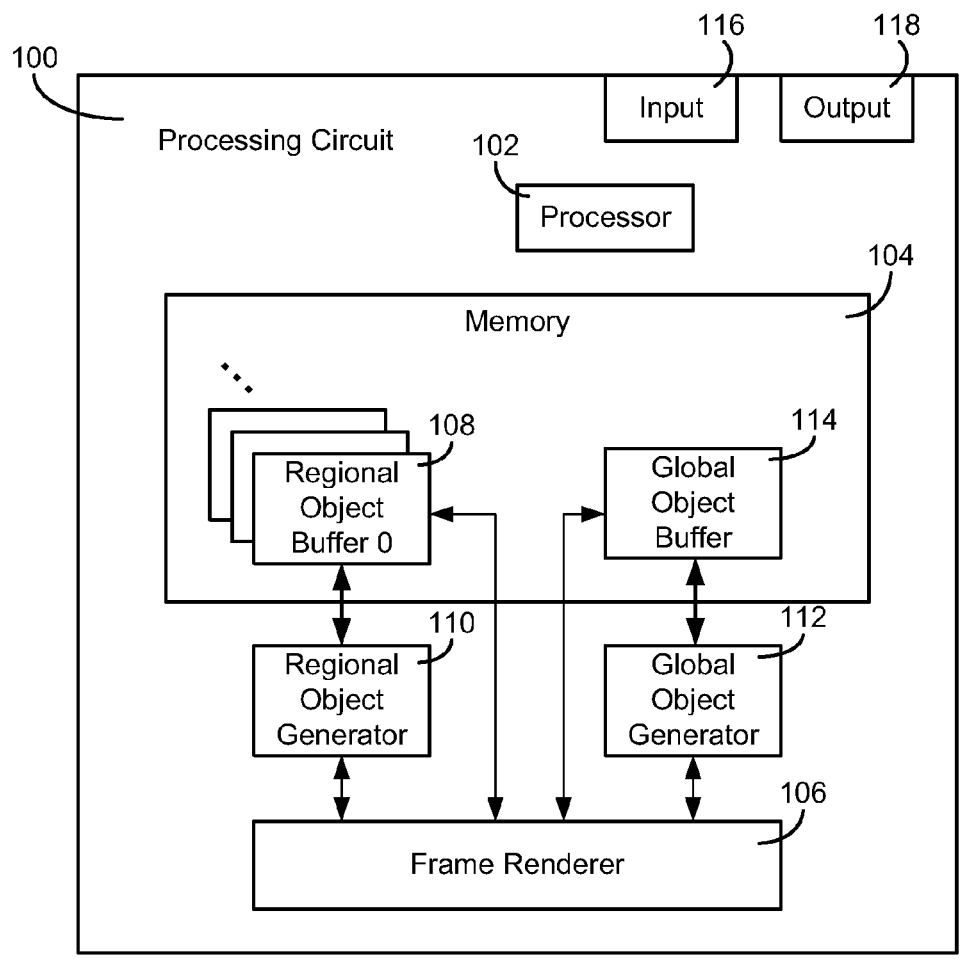
FIG. 1 is a block diagram of a processing circuit for providing objects in a graphical image, according to an exemplary embodiment.

Referring to FIG. 1, a block diagram of a processing circuit 100 for providing objects in a graphical image is shown, according to an exemplary embodiment. Processing circuit 100 may render volumetric objects. Regional objects, volumetric objects, and volumes may be used interchangeably in the discussion herein. Processing circuit 100 may initialize one or more regional volume buffers that store characteristics associated with objects. Processing circuit 100 may render one or more objects in a graphical image. Processing circuit 100 may render the remainder (i.e., apart from the object) of a graphical image. Processing circuit 100 may be configured to carry out process 300 (FIG. 3A), process 330 (FIG. 3B), process 340 (FIG. 3C), and other processes described herein and/or necessary to carry out the processes described herein.

In some embodiments, the elements of processing circuit 100 are implemented in one processing circuit. In other embodiments, the elements of processing circuit 100 are implemented in different processing circuits. For example, one processing circuit may be dedicated to rendering objects, and a separate processing circuit may be dedicated to rendering the remainder of a graphical image (e.g., the global characteristics associated with an image), etc. In some embodiments, processing circuit 100 is integrated within a single computer (e.g., one server, one housing, etc.). For example, processing circuit 100 may be implemented on EP®-80 and EP®-8000 image generator systems manufactured by Rockwell Collins, Inc. In other embodiments, the elements of processing circuit 100 are distributed across multiple servers or computers (e.g., that can exist in distributed locations).

The functions of processing circuit 100 may utilized in a variety of applications. For example, processing circuit 100 may be utilized for rendering volumetric obscurants in a flight simulation system. Volumetric obscurants include rain squalls, dust, smoke, clouds, fog, trees, bushes, etc. Processing circuit 100 may also be utilized for rendering volumetric objects in navigational systems (e.g., in aircrafts), television series, films, video games, etc. Accordingly, processing circuit 100 maybe implemented in the devices associated with each of the variety of applications.

Processing circuit 100 may include a processor 102. Processor 102 may render a two-dimensional projection (e.g., into the x-y plane of FIG. 2B) of objects in three-dimensional space. Processor 102 may associate characteristics (e.g., color, entry range) with particular objects. Processor 102 may determine which buffer a particular object's characteristics may be recorded into. Processor 102 may render an object and a graphical image containing the object for a plurality of pixels in, e.g., an electronic display. Processor 102 may record a particular object's characteristics, for each pixel covered by the object, into a determined volume buffer. Processor 102 may compute an intersection of a view ray between a pixel containing a graphical image and an object. Processor 102 may compute a proportion of the object's characteristics to apply to a pixel. Processor 102 may concatenate the object's characteristics and the graphical image's characteristics for a given pixel. Processor 102 may include a microprocessor, ASIC, FPGA, etc., or combinations thereof. In some embodiments, processor 102 may be or may additionally include a graphics processing unit (GPU). The GPU may utilize dedicated memory (i.e., a dedicated GPU) or memory otherwise (i.e., an integrated GPU) available in processing circuit 100. In some embodiments, processor 102 includes more than one processor for parallel completion of processes described herein.

Processing circuit 100 includes input 116 and output 118. User-initiated changes in the graphical image being displayed may be received at the processing circuit 100 via input 116. Input 116 may be in communication with an input device (e.g., a yoke or center-stick for controlling or simulating the control of an aircraft). The processing circuit may transmit graphical images containing objects via output 118. Output 118 may be in communication with, e.g., a display device.

Processing circuit 100 includes memory 104. According to an exemplary embodiment, memory 104 is a tangible computer-readable storage medium. Memory 104 may store machine instructions that, when executed by processor 102, cause processor 102 to perform one or more of the operations described herein. Memory 104 may store data related to rendering a graphical image containing a regional object. This data may include characteristics (e.g., transparency, exit range, etc.) about one or more objects, location of the object in three-dimensional space, etc. In some embodiments, data stored on memory 104 may be split across multiple devices.

Processing circuit 100 includes regional object generator 110 and global object generator 112. Regional object generator 110 and global object generator 112 include logic for generating regional objects and the environment of graphical scene, respectively. According to an exemplary embodiment, regional object generator 110 generates objects that span a comparatively limited portion of a three-dimensional space depicted by frames in an electronic display. For example, a regional object may be a rain squall. This exemplary weather condition may occur only in a limited region of three-dimensional space. For example, when processing circuit 100 is implemented for a flight simulation system, a pilot may fly from clear skies, into a rain squall, and back into clear skies. Multiple regional objects may exist. For example, a region of fog may precede a rain squall. Regional object generator 110 may generate one or more regional objects. According to an exemplary embodiment, global object generator 112 generates the entirety of a three-dimensional space depicted by frames in an electronic display. For example, the entirety of a three-dimensional space may be foggy. While global object generator 112 is labeled "global" in the discussion herein, in some embodiments, the data stored only affects a limited portion of the three-dimensional space. For example, the three-dimensional space may be divided into, e.g., zones. In such embodiments, global object generator 112 may store data related to conditions in each of the zones. Regional object generator 110 may generate a regional object in any of the zones.

Regional objects (e.g., volumetric obscurants) within a visual scene may be defined by a set of polygons, internal characteristics, etc. The polygons may define the shape and appearance of the volume, as viewed from a distance. The internal characteristics may define the color and obscuration density within the volume. In some embodiments, these characteristics are defined off-line during the modeling process. This may advantageously provide greater flexibility in determining the appearance and behavior of weather effects, dust, smoke, or other volumetric obscurants.

According to an exemplary embodiment, a regional object is defined as a set of polygons. The polygons define the shape and appearance of the volume. A two-dimensional projection of a volume is shown in, e.g., FIG. 2C. Data related to the visual appearance of regional objects is among the data stored in regional object generator 110. According to another exemplary embodiment, the volume is defined as double-sided. A double-sided volume may have an exterior surface and an interior surface. The exterior polygons define the appearance of the volume when viewed from the outside as well as defining the front boundary of the volume. The interior polygons define the characteristics of the inside of the volume as well as the back boundary of the volume. The polygons may use characteristics, such as texture, color, obscuration density, transparency, etc., to control the visual appearance of the exterior and interior of the object. According to an exemplary embodiment, the characteristics can be defined prior to rendering, e.g., during a modeling process. The characteristics may be stored in regional object generator 110. Defining a regional object as a set of polygons may advantageously enable a user (e.g., a modeler of the three-dimensional space) flexibility in the choosing shape, appearance, behavior, etc., of weather effects, dust, smoke, or other volumetric objects. Regional object generator 110 may also store a location for the regional object in three-dimensional space and/or a corresponding location in a two-dimensional view plane. This data may be used in conjunction with, e.g., frame renderer 106, to orient an object to a viewer's perspective (e.g., as reflected in the view plane). For example, a regional object generator 110 may locate an object behind a viewer so that forward-looking frames do not display the object.

According to an exemplary embodiment, the volume comprises (i.e., is modeled as) a convex hull. That is, the set of polygons form a convex hull. According to an exemplary embodiment, the convex hull may be modeled with no gaps or cracks. A line drawn through a convex hull (other than tangent to an edge or corner) passes through the boundary of the convex hull twice and only twice. Thus, for example, a view ray intersects a front boundary (defined by the exterior polygons) and a back boundary (defined by the interior polygons) of the convex hull. A regional object may be defined as double-sided. Thus, the volume may comprise an interior surface and an exterior surface. For example, the exterior polygons define the appearance of the volume when viewed from the outside as well as defining the front boundary of the volume. The interior polygons define the characteristics of the inside of the volume as well as the back boundary of the volume. According to another exemplary embodiment, the volume comprises (i.e., is modeled as) a concave shape.

According to an exemplary embodiment, the regional volumes described herein are three-dimensional objects that are rendered in a two-dimensional view plane (e.g., an electronic display). A user (e.g., a modeler of the graphical images) may choose the set of points (i.e., through the selection of the set of polygons) that defines (or is contained in) the convex hull. A two-dimensional projection of a convex hull is shown in, e.g., FIG. 2C. In other embodiments, the regional volume may be concave. For example, an intersection of two convex hulls (e.g., two rain squalls), may result in a concave volume.

The visual appearance of the entire scene (e.g., the "global characteristics") can also be defined prior to rendering. Like regional characteristics, the global characteristics can include texture, color, obscuration density, transparency, etc. The global characteristics can, for example, cause a foggy appearance for a rendered scene. The characteristics may be stored in global object buffer 114.

Memory 104 includes regional object buffers 108 and global object buffer 114. As the polygons of the regional object in a frame are rendered, the attributes for each pixel containing the regional object are recorded in regional object buffers 108. Regional object buffers 108 may be referred to as volume buffers. The volume characteristics may be stored in the volume buffers. According to an exemplary embodiment, the buffers store the distance to the front of the volume (entry) for each pixel, the distance to the back of the volume (exit) for each pixel, and the visibility attributes defined within the volume. The buffers may also store a location of the volume on the electronic display and/or a location of the volume in a three-dimensional space. The visibility attributes may include a color, a density, a texture, a transparency. This is shown, for example, in FIG. 2C.

In some circumstances, a frame may contain more than one regional object (e.g., two regions of fog). The regional objects may (or may not) overlap in the view plane (e.g., a display device). Also, objects may (or may not) intersect in three-dimensional space. For example, objects may overlap in the view plane but not intersect in three-dimensional space. In such circumstances, the regions would be at different depths in three-dimensional space. As another example, the objects may overlap in the view plane and intersect in three-dimensional space. The attributes of the regional objects may be recorded into regional object buffers 108 depending on the intersection of the regions in three-dimensional space. According to an exemplary embodiment, when the objects are separated by a depth in three-dimensional space (e.g., the z-direction of FIG. 2B), a separate regional buffer 108 (FIG. 1) is used to store each volume that touches the pixel. When the objects are not separated by a depth in three-dimensional space (i.e., they occupy the same x-y plane in FIG. 2B), the objects may be stored in the same buffer. In this circumstance, when the objects intersect in three-dimensional space, a shape defined by the overlap may be concave. This scheme for storing the attributes of regional objects described herein may be implemented regardless of whether or not the objects overlap in the view plane.

According to an exemplary embodiment, the regional objects are processed in order. That is, object attributes are recorded into regional buffers 108 in order of, e.g., distance, in three-dimensional space, from a viewer (e.g., changing values of z for x-y planes in FIG. 2B). In various embodiments, the order may be back-to-front or front-to-back. For example, a first object may be recorded into regional object buffer 0 when the first object is the closest object, in the frame, to the viewer. When the same frame contains a second object, the second object may or may not be written into the same regional object buffer, depending on the depth separation of the two objects in three-dimensional space. When the two objects are not separated by a depth, the second object may also be recorded into regional object buffer 0. When the objects are separated by a depth, the second object may be recorded into regional object buffer 1. In other embodiments, the order in which the regional buffers are processed is different. In some embodiments, object attributes may be recorded into the regional buffers in order. In other embodiments, regional buffers are processed in a different order, and the regional buffers are sorted (e.g., with corresponding buffer logic) prior to (or when) rendering the entire frame. In still other embodiments, the regional objects may be rendered in the same or different order than they were processed when their attributes were recorded into the regional buffers 108.

Global attributes may be recorded into a global object buffer 114 in a similar manner as described with respect to regional objects and regional object buffers 108. Global attributes may include visual attributes and/or location. For example, global object buffer 114 may store data orienting a viewer's perspective in the three-dimensional space (e.g., viewer is currently at a particular location in the three-dimensional space, and the viewer is facing a particular direction). The global object buffer may also reflect the visual appearance of the graphical image (e.g., at the particular location and in the particular perspective of the viewer, the skies are foggy).

Processing circuit 100 includes frame renderer 106. According to an exemplary embodiment, frame renderer 106 includes the logic for rendering the regional and global attributes. Frame renderer 106 may determine the viewer's location (i.e., where the viewer is in the three-dimensional space and where the viewer is looking) and current content of a frame in the view plane. Based on the location, frame renderer 106 may choose the appropriate regional objects from regional object generator 110 to write into regional object buffers 108. Frame renderer 106 may determine into which regional object buffers 108 the object attributes are recorded. Frame renderer 106 may also choose the appropriate global attributes to record. Frame renderer 106 may also store data associating user-initiated changes in perspective and the corresponding frames to be displayed. For example, in a graphical simulation system, a user provides an input corresponding to a 45° change in horizontal heading. Based on the current location and perspective of the user, frame renderer 106 may determine the graphical content to be provided for the frames corresponding to the change.

Figure 2A:
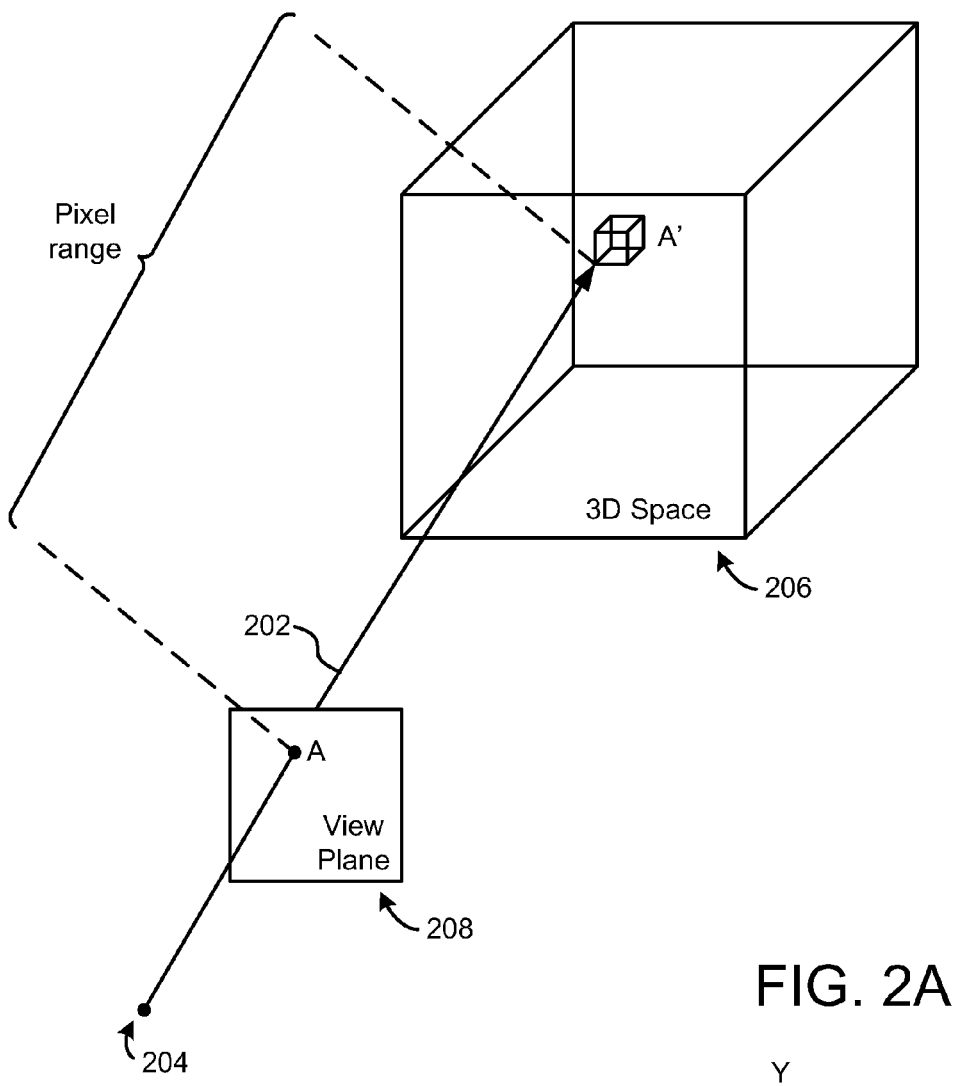
FIG. 2A is a representation of a view ray for a pixel in the view plane and the corresponding three-dimensional space, according to an exemplary embodiment.

Referring to FIG. 2A, a representation of a view ray for a pixel in the view plane and the corresponding three-dimensional space is shown, according to an exemplary embodiment. A two-dimensional projection of the three-dimensional space 206 may be depicted in view plane 208 (e.g., an electronic display). While the three-dimensional space 206 is represented as a cube in FIG. 2A, it extends outward in both positive and negative directions. View ray 202 is a representation of the path that light, for a pixel A, travels through a view plane 208 to the space A' in three-dimensional space 206. Space A' is depicted by pixel A in the view plane 208. View ray 202 originates at view ray origin 204. View ray origin 204 represents the position, orientation, and/or perspective of a viewer of the three-dimensional space 206. In the embodiment of FIG. 2A, view ray origin 204 is shown to be in front (along the z-axis) of space A'. Depending on the image being depicted in view plane 208, view ray 204 may originate at any point in the three-dimensional space 206. A pixel range, as shown in FIG. 2A, may be defined as the distance from a pixel A in the view plane 208 to the corresponding space A' in the three-dimensional space 206. In other embodiments, a different origin (other than view plane 208) may be used for measuring the pixel range. The shapes depicted in FIG. 2A (e.g., circle for pixel A, cube for space A', etc.) are exemplary and may vary in other embodiments.

Figure 2B:
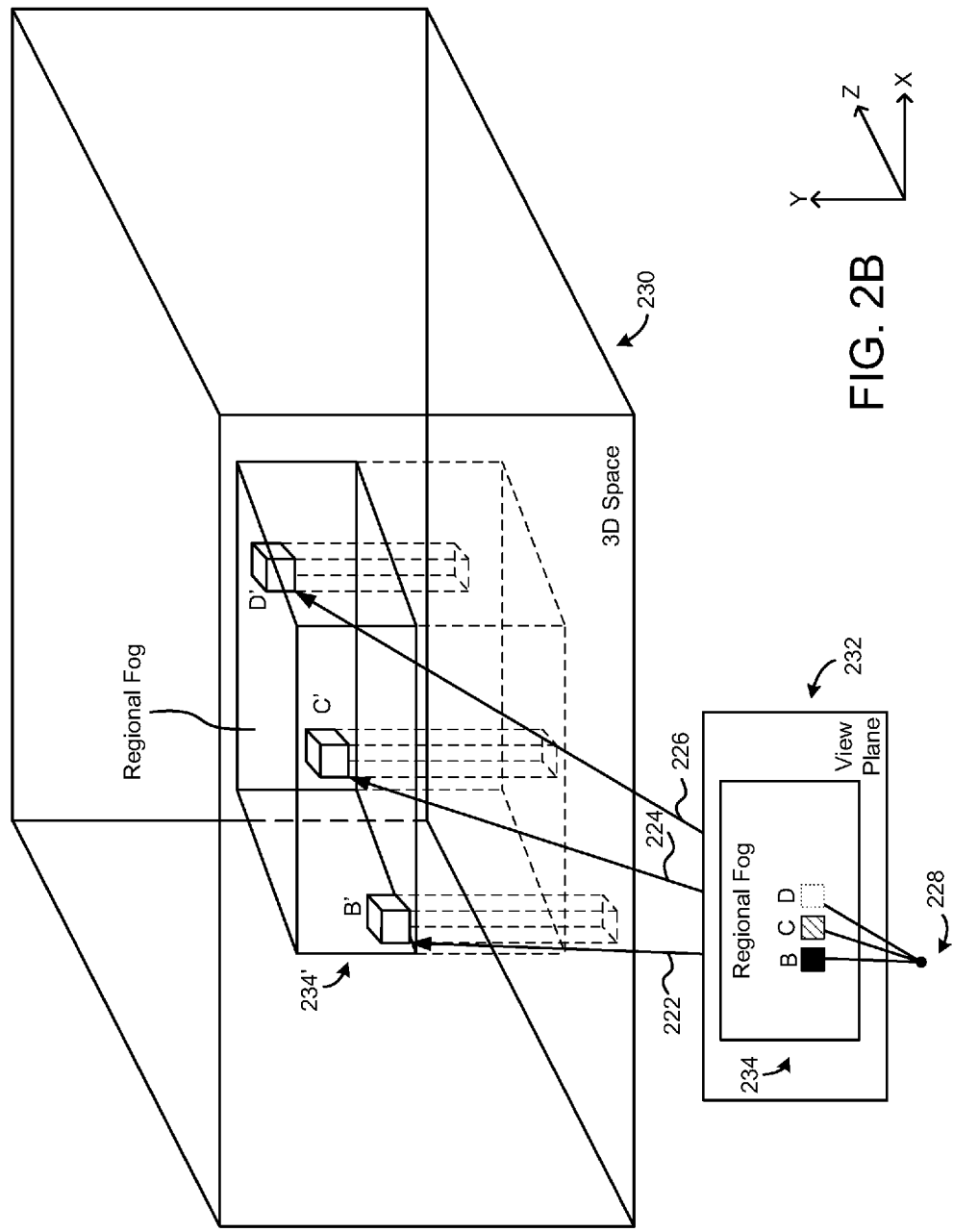
FIG. 2B is a representation of multiple sets of view rays and pixels in a view plane, as well as the corresponding three-dimensional space, according to an exemplary embodiment.

Referring to FIG. 2B, a representation of multiple sets of view rays and pixels in a view plane, as well as the corresponding three-dimensional space, is shown, according to an exemplary embodiment. FIG. 2B includes view plane 232, which contains pixels B, C, and D. Pixels B, C, and D correspond to spaces B', C', and D', respectively, in three-dimensional space 230. FIG. 2B contains view rays 222, 224, 226 (having view ray origin 228) for pixels B, C, and D, respectively. View plane 232 also contains regional fog 234, corresponding to regional fog volume 234' in three-dimensional space. Regional fog volume 234' is one example of the regional objects that may be rendered, along with the remainder of a graphical image, by the processes described herein. The shapes depicted in FIG. 2B (e.g., square for pixel B, cube for space B', rectangle for regional fog 234, rectangular prism for regional fog volume 234', etc.) are exemplary and may vary in other embodiments. View rays 222, 224, 226 are shown to originate outside of (in front of) regional fog 234'. In other embodiments, view rays 222, 224, 226 may originate in other locations (e.g., inside of, to the side of, in the back of regional fog volume 234').

View rays 222, 224, 226 are associated with space B',C', and D', which are variously located in three-dimensional space 230. In the embodiment of FIG. 2B, pixels B, C, and D are depicted with varying levels of obscuration in view plane 232. Pixel B represents that space B' is in front of regional fog volume 234' (i.e., space B' is not obscured by regional fog volume 234'). Pixel C represents that space C' intersects regional fog volume 234' (i.e., space C' is partially obscured by regional fog volume 234'). Pixel D represents that space D' is behind regional fog volume 234' (i.e., space D' is fully obscured by regional fog volume 234'). FIG. 2B is shown to include dashed lines representing projections of volume 234', space B', space C', and space D' into the x-z plane. The projections are intended to show the relative positioning of volume 234', space B', space C', and space D' in the three-dimensional space (i.e., space B' is in front of volume 234', space C' is within volume 234', and space D' is behind volume 234'). The position, along the z-axis, of spaces B', C', and D', relative to regional fog volume 234', is more clearly illustrated in FIG. 2E. Note that the degree of obscuration (as reflected in the graphical image displayed in view plane 232) may vary depending on the attributes of the regional fog volume. For example, a regional fog volume with a dark color, high density, and/or low transparency will obscure a space more than a regional fog volume with a light color, low density, and high transparency. Also, as described in more detail below, the extent of the intersection of the view ray for a pixel corresponding to the regional fog volume 234' will influence the degree of obscuration. For example, for pixel C, the farther that view ray 224 penetrates regional fog volume 234' (i.e., to reach space C'), the more that the characteristics of regional fog volume 234' will be applied to pixel C.

Figure 2C:
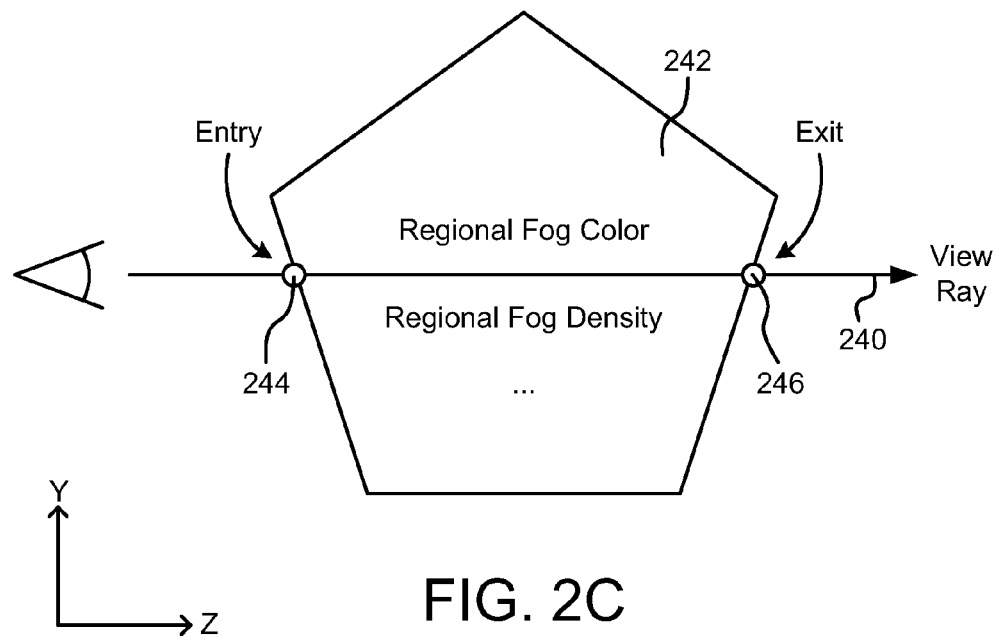
FIG. 2C is a two-dimensional projection of a regional object, with a view ray, according to an exemplary embodiment.

Referring to FIG. 2C, a two-dimensional projection of a regional object, with a view ray, is shown, according to an exemplary embodiment. In some embodiments, regional object 242 is a set of polygons that form an exterior surface and an interior surface. In some embodiments, regional object 242 is a convex hull. Regional object 242 may be a projection of regional fog volume 234' (FIG. 2B) into the y-z plane. As reflected in FIG. 2C, regional object 242 has attributes or characteristics associated with it. Regional object buffers 108 may store the attributes and/or characteristics associated with the regional objects. These include, e.g., color, density, etc. A view ray 240 is shown to intersect regional object 242 at an entry 244 and an exit 246. Entry point 244 is an intersection of a view ray and an exterior surface of regional object 242. Exit point 246 is an intersection of a view ray and an interior surface of regional object 242. A view ray continues into the regional object 242 after entering regional object 242 at entry point 244. A view ray may intersect regional object 242 for different extents or amounts. For example, a view ray corresponding to a pixel within a regional object may intersect the regional object 242 an amount proportional to the distance traveled within the regional volume. The view ray in FIG. 2C is exemplary, and other view rays may occur at different angles with respect to regional object 242 and intersect at different locations.

Figure 2D:
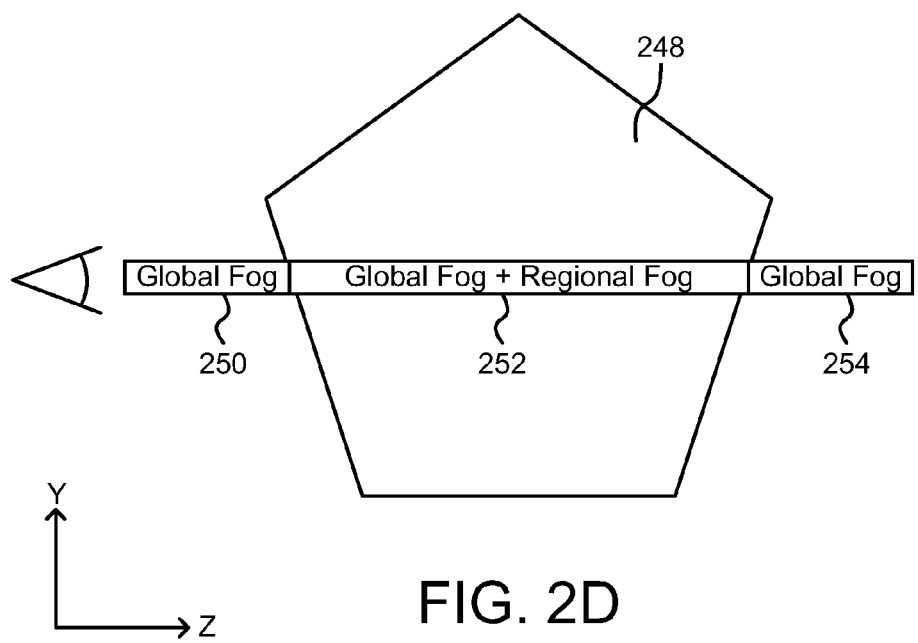
FIG. 2D is a two-dimensional projection of a regional object, with global and regional characteristics, according to an exemplary embodiment.

Referring to FIG. 2D, a two-dimensional projection of a regional object, with global and regional characteristics, is shown, according to an exemplary embodiment. According to an exemplary embodiment, after the regional objects are recorded into regional object buffers 108, the visual scene can be rendered. As the scene is rendered, each pixel's view ray is tested against the regional objects previously stored. If a view ray intersects a regional object, the object's visibility characteristics are applied to that portion of the view ray that is inside the object. Global attributes may be applied to the entirety of the view ray. This is illustrated in FIG. 2D. In the embodiment of FIG. 2D, a pixel's view ray may interest a front boundary and a back boundary of regional object 248. Zones 250, 254 correspond to portions of the pixel's view ray outside of the regional object 248. Accordingly, only global attributes are applied to zones 250, 254. Zone 252 corresponds to the portions of the pixel's view ray that intersects the regional object 248. Accordingly, both global and regional characteristics are applied to zone 252. This process may advantageously result in a more accurate representation of regional effects (e.g., weather). Furthermore, the process may advantageously account for elements within the regional object in a more accurate manner. The process may also advantageously reflect a viewer's position when entering and/or exiting the object in a more accurate manner.

Figure 2E:
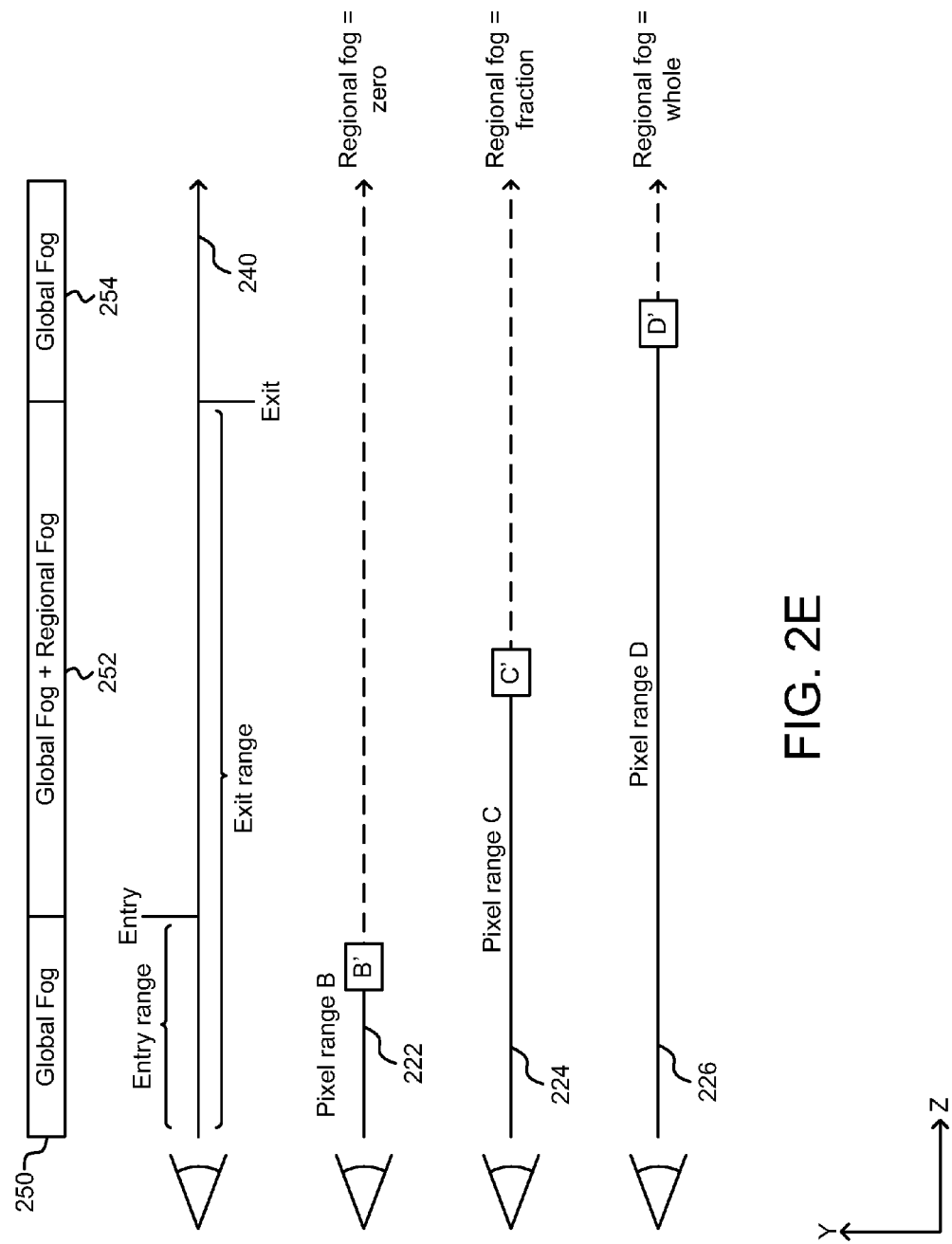
FIG. 2E is a two-dimensional projection of view rays corresponding to spaces B', C', and D' of FIG. 2B, according to an exemplary embodiment.

Referring to FIG. 2E, a two-dimensional projection of view rays corresponding to spaces B', C', and C' of FIG. 2B, is shown, according to an exemplary embodiment. FIG. 2E also includes zones 250, 252, 254. Zone 252 corresponds to a regional object, and zones 250, 254 correspond to areas without a regional object. View ray 240 is an exemplary view ray that intersects the front boundary (entry) and the back boundary (exit) of the regional object represented by zone 252. View ray 240 includes an entry range into and exit range out of a regional object. The entry range describes a portion of a view ray from a view plane (or some other origin) to the front boundary of a regional object. The exit range describes a portion of the view ray from the view plane to the back boundary of a regional object. The entry point is lined up with the front boundary of the zone 252, and the exit point is lined up with the back boundary of zone 252. The projections of view rays 240, 222, 224, and 226 in the y-z plane originate from left of the page (e.g., off the page or on the page) and continue to the right. View rays 222, 224, 226 are shown in solid line from an origin to the corresponding spaces B',C', and D', respectively. Dashed lines are used for the area beyond the spaces B', C', and D'.

Pixel range B 222 of FIG. 2E corresponds to the view ray for pixel B and space B' of FIG. 2B. Space B' occurs before the front boundary of the regional object associated with zone 252 (e.g., space B' is not obscured by the regional object). As a result, view ray 222 does not intersect the regional object, and no regional characteristics may be applied to pixel B. Pixel range C 224 of FIG. 2E corresponds to the view ray for pixel C and space C' of FIG. 2B. Space C' intersects the regional object to some extent (e.g., space C' is partially obscured by the regional object). As a result, view ray 224 intersects the regional object a fractional amount (e.g., equal the depth or distance in the z-direction in the regional object at which space C' occurs compared to the total depth or distance in the z-direction of the regional object). Similarly, a fractional amount of the regional characteristics may be applied to pixel C. Pixel range D 226 of FIG. 2E corresponds to the view ray for pixel D and space D' of FIG. 2B. Space D' occurs behind the back boundary of the regional object (e.g., space D' is fully obscured by the regional object). As a result, view ray 226 intersects the entirety of the regional object, and the full amount of the regional characteristics may be applied to pixel D.

Figure 4A:
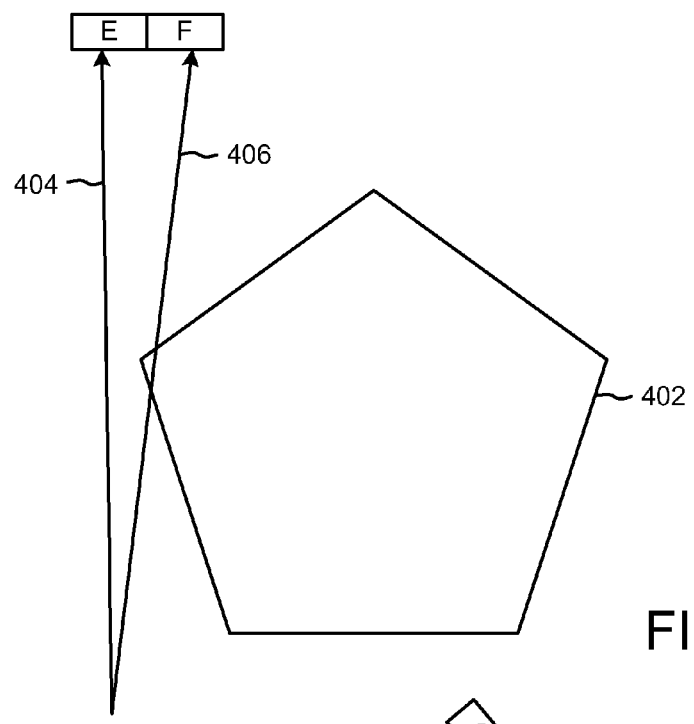
FIGS. 4A and 4B are representations of a volumetric object and adjacent pixels, in a conventional system, according to exemplary embodiments.

According to an exemplary embodiment, the proportion of regional characteristics that are applied to pixels C and D depend on the view ray's intersection of the regional object. For example, view ray 406 of FIG. 4A intersects regional object 402 to a lesser extent than view ray 426 of FIG. 4B intersects regional object 422 of FIG. 4B. Accordingly, pixel H, associated with view ray 426 (FIG. 4B) has a greater proportion of regional characteristics applied than pixel F, associated with view ray 406 (FIG. 4A).

Figure 2F:
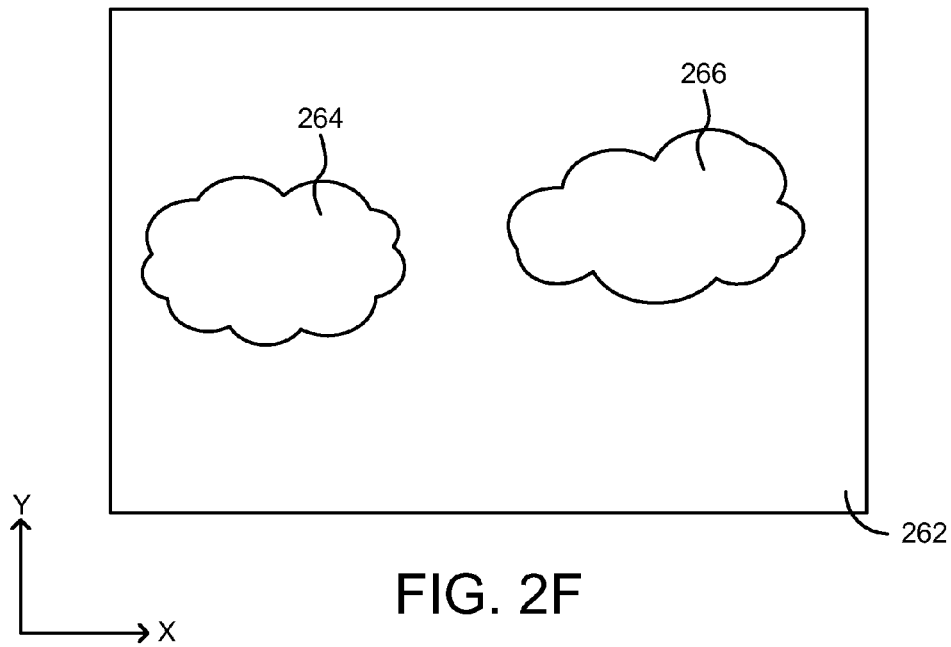
FIG. 2F is a representation of multiple regional objects, in a view plane, according to an exemplary embodiment.
Figure 2G:
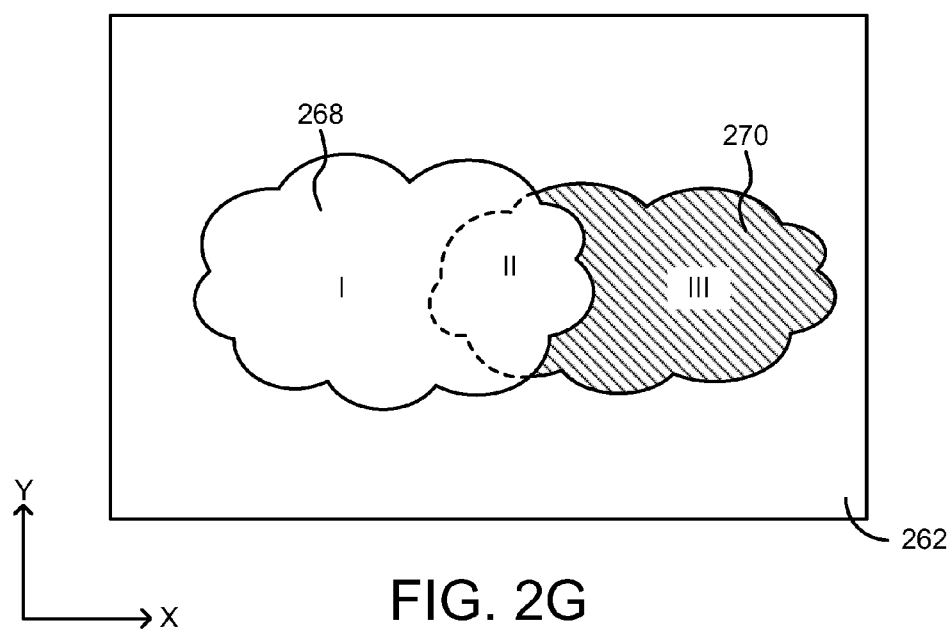
FIG. 2G is another representation of multiple regional objects, in a view plane, according to an exemplary embodiment.

Referring to FIG. 2F, a representation of multiple regional objects 264, 266, in view plane 262, are shown, according to an exemplary embodiment. Regional objects 264, 266 are shown not to intersect in the view plane 262 (e.g., the x-y plane). Regional objects 264, 266 may be at the same or different depths (e.g., distance along the z-axis) in three-dimensional space. In some embodiments, when the regional objects 264, 266 are at the same depth (e.g., same location on the z-axis), the characteristics or attributes of regional objects 264, 266 are stored in the same regional object buffer (e.g., regional object buffers 108 of FIG. 1). In some embodiments, when the regional objects 264, 266 are at different depths (e.g., different locations on the z-axis), the characteristics and attributes associated with each regional object are stored in separate regional object buffers. According to an exemplary embodiment, the regional objects that are nearest to a user's perspective (i.e., at the shortest distance along the z-axis) are stored in an initial regional object buffer (e.g., regional object buffer 0), and progressively farther regional objects are stored in subsequent regional object buffers (e.g., regional object buffer 1, regional object buffer 2, etc.). In the embodiment of FIG. 2G, two regional objects are shown; in different embodiments, one, two, or more regional objects may be displayed in view plane 262.

Referring to FIG. 2G, a representation of multiple regional objects 268, 270, in view plane 262, are shown, according to an exemplary embodiment. Regional objects 268, 270 are shown to intersect in the view plane 262 (e.g., the x-y plane). Regional objects 268, 270 may be at the same or different depths (e.g., distance along the z-axis) in three-dimensional space. In some embodiments, when the regional objects 268, 270 are at different depths (e.g., different locations on the z-axis), the characteristics and attributes associated with each regional object are stored in separate regional object buffers. In these embodiments, regional objects 268, 270 are each convex hulls. For a pixel containing regional objects 268, 270, the characteristics of regional objects 268, 270 are concatenated (along with the global characteristics) when the scene is rendered. In some embodiments, when regional objects 268, 270 are at the same depth (e.g., same location on the z-axis), the union of the objects (i.e. overall shape of the combination of regional objects 268, 270) is a concave hull. The buffer logic described herein may be modified to handle multiple entry and exit points along a view ray. The characteristics and attributes associated with the concave hull may be stored in one regional object buffer. According to an exemplary embodiment, the regional objects that are nearest to a user's perspective (i.e., at the shortest distance along the z-axis) are stored in an initial regional object buffer (e.g., regional object buffer 0), and progressively farther regional objects are stored in subsequent regional object buffers (e.g., regional object buffer 1, regional object buffer 2, etc.). In the embodiment of FIG. 2G, two regional objects are shown; in different embodiments, one, two, or more regional objects may be displayed in view plane 262.

Figure 3A:
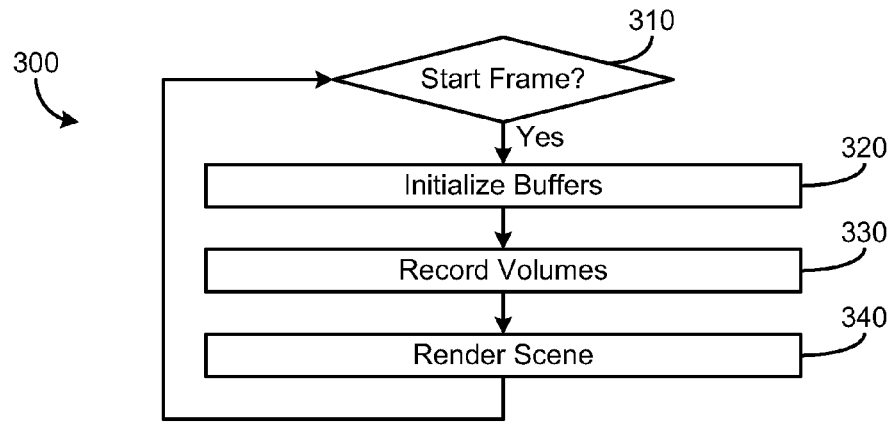
FIG. 3A is a flow diagram of a process for rendering a frame in a computer-generated scene, according to an exemplary embodiment.

Referring to FIG. 3A, a flow diagram of a process 300 for rendering a frame in a computer-generated scene is shown, according to an exemplary embodiment. Process 300 may be implemented on a processing circuit, e.g., processing circuit 100 (FIG. 1). According to an exemplary embodiment, process 300 is a high-level flow diagram of processes described in more detail in FIGS. 3B and 3C. Process 300 may be repeated for each frame as one or more computer-generated frames are rendered.

Process 300 includes the start of a frame (310). A new frame may be rendered when a new and/or modified graphical image is required to be displayed. A new graphical image may be required, for example, with a change in the viewer's perspective. For example, in a graphical simulation system of aircraft, a user may initiate a change in pitch, roll, and/or yaw. The simulated perspective of the aircraft pilot changes as a result, and a new graphical image is required. The content (i.e., what is displayed) and order (i.e., when it is displayed) of one or more graphical images may be stored in, e.g., memory 104.

Process 300 includes initializing regional object buffers (320). Regional object buffers (e.g., regional object buffers 108 of FIG. 1) store the characteristics and/or attributes of the regional objects. The same or different regional object buffers may be used for rendering different regional objects. According to an exemplary embodiment, different regional object buffers are used to store regional object buffers at different depths (e.g., points along the z-axis). According to another exemplary embodiment, the same regional object buffer is used to store regional objects at the same depth (e.g., point along the z-axis).

Process 300 includes rendering the volumetric objects (330) and rendering the scene (340). The volume volumetric objects may be defined as a volume. The volume may comprises a plurality of polygons. In some embodiments, the volumetric objects are rendered before the remainder of the scene is rendered. In some embodiments, the remainder of the scene is rendered before the volumetric objects in the scene are rendered. In some embodiments, the volumetric objects and the remainder of the scene are rendered in parallel. The volume may be described by volume characteristics. According to an exemplary embodiment, the internal state values (e.g., the visibility characteristics and/or attributes, e.g., color, density, etc.) of the volume defining polygons are recorded into the regional object buffers. The buffers may also store the distance to the front of the volume (entry) for each pixel and the distance to the back of the volume (exit) for each pixel. The regional object data may be recorded for each pixel covered by the volume. The graphical image may be described by global characteristics. According to another exemplary embodiment, rendering the remainder of the scene includes determining the global characteristics and concatenating the global and regional characteristics to render the scene.

The volume may be rendered for a first plurality of pixels of an electronic display. The first plurality of pixels correspond to the spatial extent of the volume. The entirety of the graphical image may be rendered for a second plurality of pixels of an electronic display. The second plurality of pixels correspond to the spatial extent of the graphical image. According to an exemplary embodiment, when a view ray for at least one of the second plurality of pixels intersects at least one of the first plurality of pixels, the global characteristics and a proportion of the volume characteristics are combined when rendering the graphical image. The proportion of the volume characteristics may be defined by an extent of the intersection of the view ray. The process for rendering volumetric objects (step 330) is described in more detail in the discussion of FIG. 3B. The process for rendering the scene (step 340) is described in more detail in the discussion of FIG. 3C.

Figure 3B:
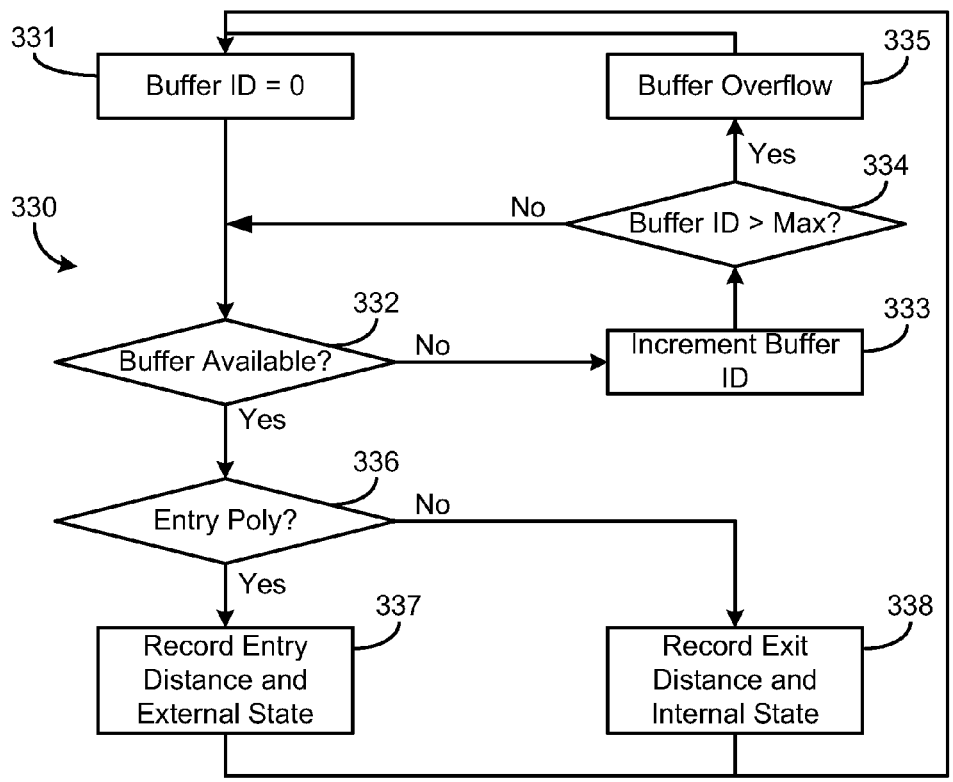
FIG. 3B is a flow diagram of a process for recording data associated with volumetric objects, according to an exemplary embodiment.

Referring to FIG. 3B, a flow diagram of a process 330 for recording data associated with volumetric objects is shown, according to an exemplary embodiment. Process 330 may be described as recording, for each of a first plurality of pixels (describing a spatial extent of the volume), the volume characteristics in a volume buffer, and providing display data configured to cause an electronic display to display the volume. According to an exemplary embodiment, process 330 may occur for volume-defining polygons. According to another exemplary embodiment, process 330 may occur for each pixel containing or associated with a volumetric object. Process 330 may be implemented on a processing circuit, e.g., processing circuit 100 (FIG. 1). Process 330 is one embodiment of a detailed description of step 330 (FIG. 3A).

Process 330 includes initializing a buffer ID counter to zero (331). According to an exemplary embodiment, a regional object buffer with a lower ID number corresponds to a volumetric object that is closer to a user when the volumetric object is viewed on a display compared to a volumetric object associated with a regional object buffer with a higher ID number. In some embodiments, regional object buffers may not be labeled and/or organized in a particular order. In such embodiments, data (e.g., distance of the volumetric object) may be stored in a memory (e.g., memory 104 of FIG. 1) accessible by a processor (e.g., processor 102 of FIG. 1). This data may be used to designate an order in which the buffers are to be written into. Other organizational schemes may be utilized different embodiments.

Process 330 includes testing the selected buffer to determine if it is available or if it has already been filled (332). The selected buffer may have already been filled by a previously rendered volume that touched the same pixel. If the buffer is not available, the buffer ID may be incremented (333). In some embodiments, the buffer ID counter may have a maximum value, corresponding to a maximum number of regional object buffers available in memory. Process 330 includes determining, when the buffer ID is incremented, if the current buffer ID is greater than the maximum value (334). This may indicate that all of the buffers are full. If the current buffer ID is greater than the maximum, a buffer overflow process may be implemented (335). In some embodiments, in the event of an overflow, the attributes associated with the current volumetric object may be discarded. According to an exemplary embodiment, discarding the attributes may not substantially affect the frame because the discarded attributes would have been added behind (i.e., farther from the observer) a maximum number of volumetric objects. The visual appearance of a pixel that already contains a maximum number of volumetric objects (e.g., fog) may not change when one additional volumetric (e.g., more fog) object is added to the back. In some embodiments, attributes associated with the current volumetric object may be blended with a volume already stored in a buffer. This may avoid discarding attributes of volumetric objects. According to an exemplary embodiment, the current volumetric object may be blended with a volumetric object stored in the buffer with the maximum value. Relative distance from the observer, volume density, etc., may be considered when deciding whether and how to discard or blend excess volumes. The method chosen may be dependent on the importance of accurately handling multiple overlapping volumes, as well as dependent on the implementation resources available. If the current buffer ID (step 333) is not greater than the maximum value (step 334), then the current buffer ID may be tested to determine if it is available (332).

Process 330 may render a plurality of volumes. In some embodiments, when the graphical image contains a plurality of volumetric objects, the volume characteristics of the plurality of volumes are stored in a plurality of volume buffers. In some embodiments, the volume characteristics for each of the plurality of volumes are stored in a different volume buffer, when the plurality of volumes are separated by a depth in three-dimensional space. In some embodiments, the volume characteristics of the nearest volume in three-dimensional space are stored in an initial volume buffer, and the volume characteristics for subsequent volumes are stored sequentially in subsequent volume buffers. In some embodiments, the volume characteristics of the farthest volume in three-dimensional space are discarded when a maximum number of volume buffers is reached. In some embodiments, the volume characteristics of the farthest volume (i.e., the last volume) are combined with the volume characteristics of the next farthest volume (i.e., the closest volume thereto or the second-to-last volume), when a maximum number of volume buffers is reached.

Process 330 includes, if the selected buffer is available, determining if the current polygon being rendered represents the front surface of the volume (external/outward facing polygon) or the back surface (internal/inward facing polygon) (336). An external facing polygon may be described in the discussion of view ray 222 (FIG. 2E). An internal facing polygon may be described in the discussion of view ray 224 (FIG. 2E). If the polygon is facing outward (e.g., the view ray intersects the pixel outside of the volume), the distance to the entry point of the surface and the visual characteristics (or state) of the volume as viewed from the outside may be recorded and stored in the entry buffer (337). If the polygon is facing inward (e.g., the view ray intersects the pixel inside of the volume), the distance to the back of the volume and the internal state characteristics of the volume may be recorded and stored in the exit buffer (338). In some embodiments, the entry and exit distances may be used to apply a proportion of a volumetric object's characteristics. For example, for an internal facing polygon, a greater proportion of the volume's internal characteristics may be applied when the distance to the back of the volume is smaller.

Figure 3C:
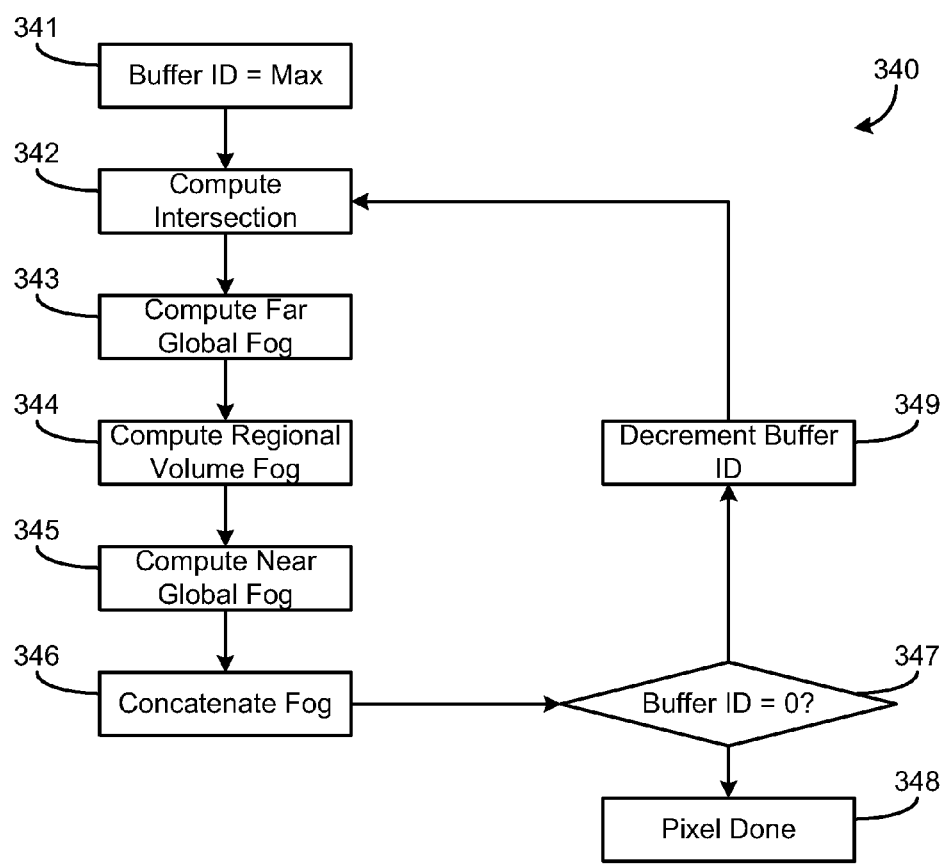
FIG. 3C is a flow diagram of a process for rendering a scene including volumetric objects, according to an exemplary embodiment.

Referring to FIG. 3C, a flow diagram of a process 340 for rendering a scene including volumetric objects is shown, according to an exemplary embodiment. Process 340 may occur for every pixel for each polygon in the scene (i.e., regardless of whether the polygons are volume-defining polygons or not). That is, process 340 may account for pixels that do and do not contain volume-defining polygons. Process 340 may be implemented on a processing circuit, e.g., processing circuit 100 (FIG. 1). Process 340 is one embodiment of a detailed description of step 340 (FIG. 3A).

According to an exemplary embodiment, the volumes are processed in a specific order to obtain a visual scene with overlapping volumes as desired. A visual scene may include multiple volumetric objects, some of which overlap and are in front of/behind others. For example, a scene may include two volumetric objects: a region of fog and a tree. In three-dimensional space, the tree may be behind the region of fog. A user desires the volumetric object that is closer to the user in the 3D space (e.g., the region of fog) to appear in front of the view plane compared to volumetric objects (e.g., the tree) that are farther away. In various embodiments, the volumetric objects are processed in back-to-front (farther from user-to-nearer to user), front-to-back, or other order. In some embodiments, the volumes can be processed in order based on their corresponding buffers (e.g., highest buffer-to-lowest buffer), e.g., when the buffers are chronologically arranged. In some embodiments, the data (e.g., distance of the volumetric object) may be stored in a memory that allows a processor to sort the volumes in a desired order when a frame is rendered.

According to an exemplary embodiment, process 340 may begin after all volume defining polygons have been rendered and stored in regional object buffers. Process 340 may render the rest of the visual database and apply to the fog volume data to these polygons in the scene. According to an exemplary embodiment, process 340 may begin after the volumetric objects have been sorted (based on e.g., buffer ID, distance of the volumetric object, etc.). In the embodiment of FIG. 3C, the volumes may be sorted in back-to-front order. In such an embodiment, the volume in buffer ID=0 (i.e., the volume that is closest to user) is processed last. In other embodiments, the volumes may be sorted and processed in different orders with a processing circuit configured to ensure that the volumetric objects overlap in a visual scene a user desires.

Process 340 may include computing an intersection of a view ray for at least one of a second plurality of pixels (corresponding to the spatial extent of the visual scene) with at least one of a first plurality of pixels (corresponding to the spatial extent of a volume). Process 340 may include computing an extent of the intersection. Process 340 may include computing the proportion of the volume characteristics to apply to at least one of the second plurality of pixels. Process 340 may include combining the proportion of the volume characteristics and the global characteristics. Process 340 may include providing display data configured to cause the electronic display to display the graphical image containing the volumetric object.

Process 340 begins with the largest buffer ID (341). The current pixel's view ray may be tested against the selected volume data that has been stored in the buffers. The distance to the polygon may be compared with the volume's entry distance and exit distance. In some embodiments, the view ray for the current pixel is divided into three segments (342): the distance from the eye to the entry of the volume (near), the distance of the ray traveling through the volume (exit-entry), and the distance from the exit to the polygon (far). Any of these terms may have a value of zero, depending on the pixel corresponding to the view ray. For a pixel corresponding to a space inside the volume, the distance from the exit to the polygon (far) would be zero because the view ray terminates inside the volume. If the view ray did not intersect any volumes, the volume contribution would be zero.

Process 340 includes computing the fog associated with each of the three segments. Global characteristics may be applied to the far portion of the view ray (343) and the near portion (345). The global characteristics may also be applied to the distance spanned by the volumetric objects. The volume's characteristics (e.g., color, density, etc.) may be applied to the portion of the view ray within the volume (344). Only a portion of the fog density characteristics may be applied to the view ray, depending on how far into the volume the view ray traverses. For example, a view ray that terminates after traveling 10% of the distance through the volume will have less of the volume characteristics applied to it compared to a view ray that travels the entire distance of the volume. These three values may be concatenated together to determine the total characteristics to apply to the pixel (346). In some embodiments, the volume characteristics of the plurality of volumes may be combined when at least one of a first plurality of pixels (corresponding to the spatial extent of one or more volumes) contains a plurality of volumes. As a result, the far and near portions of the view ray have the global characteristics; the portions of the view ray corresponding to the volume have both the global characteristics and the regional volume characteristics (as shown, for example, in FIG. 2D).

In some embodiments, the volume attributes may be applied to the portion of the view ray corresponding to the volume, and the global characteristics may be applied to the entire view ray. That is, in such embodiments, the view ray is not divided into a near portion and a far portion. Rather, the global characteristics are applied to the entirety of the view ray, and the regional characteristics are applied to the portion of the view ray corresponding to the volume. The global and characteristics may be concatenated as in step 346.

Process 340 continues with decrementing the buffer ID to process the next volume (349). This next volume's contribution may be concatenated with that already computed in step 346. Process 340 continues until all volumes have been processed, i.e., buffer ID=0 (347). Upon completion, the total accumulated characteristics can be applied to the polygon being rendered (348).

Figure 4B:
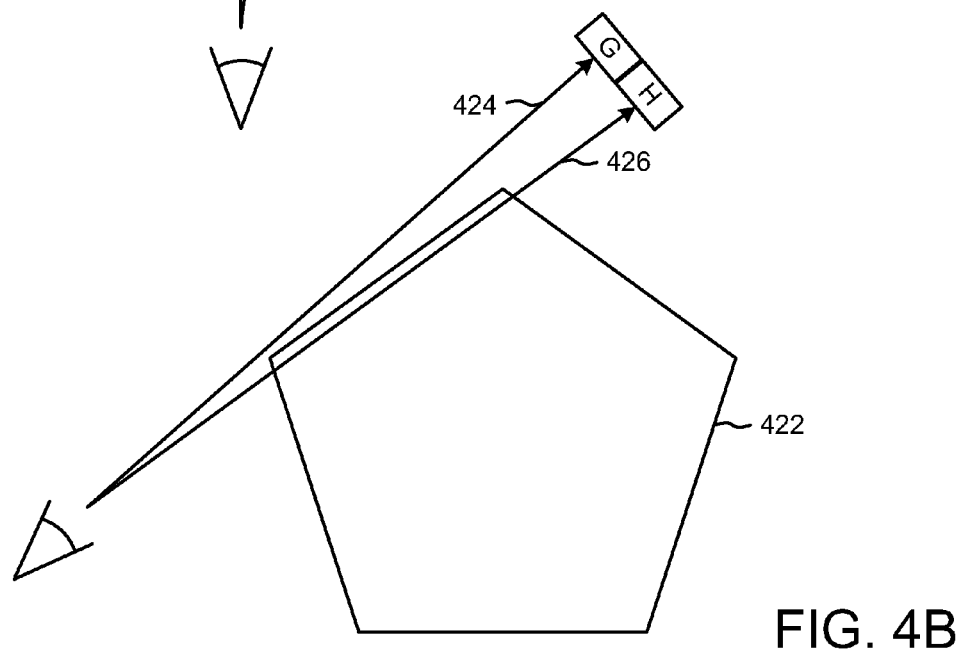

Referring to FIGS. 4A and 4B, representations of a volumetric object and adjacent pixels, in a conventional system, are shown, according to exemplary embodiments. FIG. 4A contains volume 402 (a pentagon in this embodiment) and view rays 404, 406, corresponding to adjacent pixels E, F. FIG. 4B contains volume 422 (a pentagon in this embodiment) and view rays 424, 426, corresponding to adjacent pixels G, H. FIGS. 4A and 4B may illustrate factors, such as aliasing, in ensuring image quality of a visual scene. In FIG. 4A, view ray 404 does not intersect the volume, while the view ray 406 does. Pixel E would therefore have no volume characteristics applied to it, while pixel F would have a small amount. Such a situation generally results in an image with minimal aliasing. In FIG. 4B, the view position is oriented such that the view ray intersecting the volume is almost parallel to one facet of the volume. Thus, this pixel H's view ray 426 penetrates a fairly large amount of the volume and would therefore have a greater proportion of the volume's characteristics applied. Pixel G would have no volume characteristics applied because view ray 424 does not intersect the volume. Such a situation, with a sudden change from no volume characteristic (pixel G) to a significant amount of volume characteristics (pixel H) may cause aliasing.

Figure 4C:
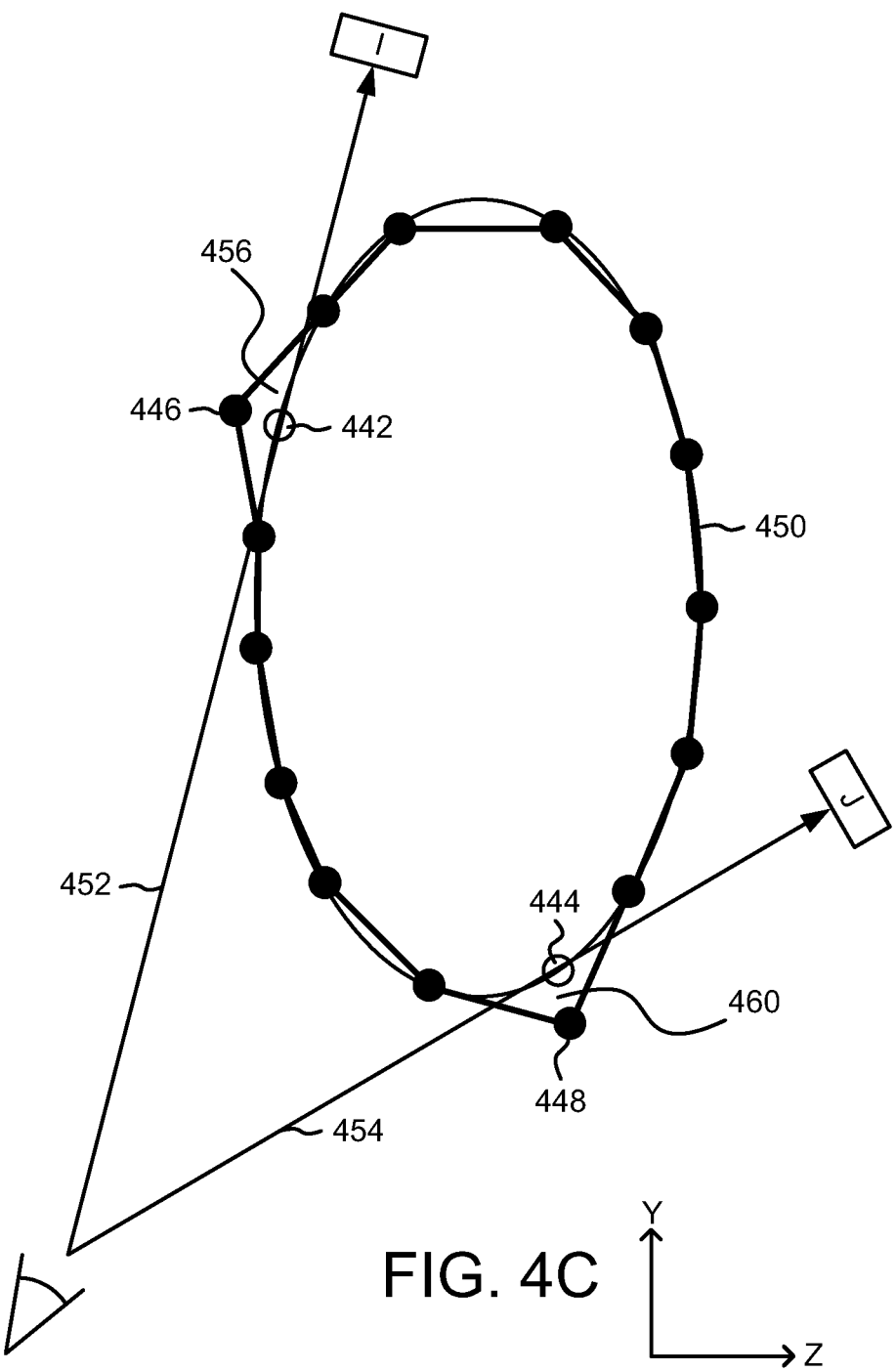
FIG. 4C is a representation of a volumetric object of the system described herein, according to an exemplary embodiment.

Referring to FIG. 4C, a representation of a volumetric object of the system described herein is shown, according to an exemplary embodiment. The method and system described herein may advantageously avoid aliasing and offer a user the ability to tune the softness of the volume's edge appearance. The method and system may be described as reducing aliasing of the edges of a volume by identifying vertices of the volume that are tangential to at least one view ray and moving the identified vertices outward. At least one view ray may intersect the volume through the area created by moving the identified vertices outward.

According to an exemplary embodiment, during run-time, the vertices used to define the volume may be analyzed to find the ones that are tangential with a view ray associated with the viewer's position. In FIG. 4C, view rays 452, 454, for pixels I, J, respectively, are shown. The tangential vertices are vertices 442, 444. When those vertices have been identified, they may be nudged or moved outward, away from the center of the volume. The vertices in FIG. 4C, once nudged away from the center, are vertices 446, 448. The view ray then intersects the volume through the area created by moving the identified vertices outward. Areas 456, 460 are created by moving the vertices outward in FIG. 4C. View ray 452 intersects the volume in area 456, and view ray 454 intersects the volume in area 460. This advantageously ensures that the edge of the volume (as currently being rendered) always has a fin that gradually increases in volume thickness as the view ray approaches the center. In various embodiments, aliasing can be further minimized by adjusting the amount of nudging applied as well as shaping the fin by nudging adjacent vertices. According to an exemplary embodiment, the steps described for reducing aliasing may be performed along with the initializing of the regional object buffers (step 320 of FIG. 3A). The steps may be performed at different stages in rendering a frame in various embodiments.

In some embodiments, the volume may define a convex hull. Each view ray that penetrates the volume may contain exactly one entry polygon and exactly one exit polygon. In some embodiments, the volume may be concave, such that the view ray that penetrates the volumes may contain more than one entry polygon and/or more than one exit polygon. The logic for processing a volumetric object and rendering a frame described herein may be adjusted to process concave shapes.

In some embodiments, nudging the tangent vertices outward may change the convex hull to a concave shape. However, the shape may still be convex from the perspective of the viewer. That is, the volume may be concave, but each view ray may only contain a single entry polygon and a single exit polygon intersection. This may advantageously minimize the computations undertaken by a processing circuit in processing the volume.

Figure 5A:
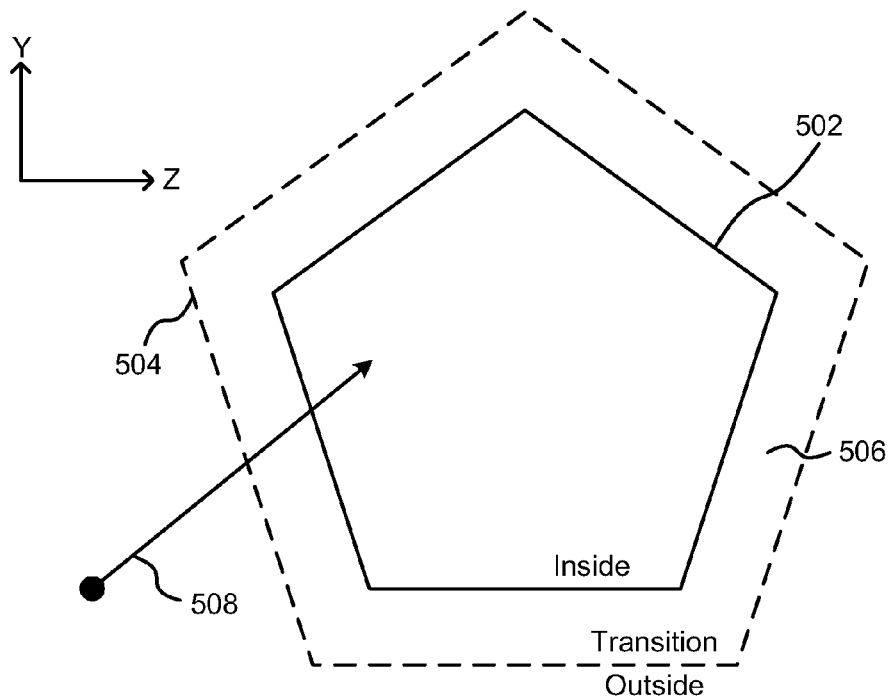
FIGS. 5A-5B are representations of a volumetric object with a transition zone, according to exemplary embodiments.
Figure 5B:
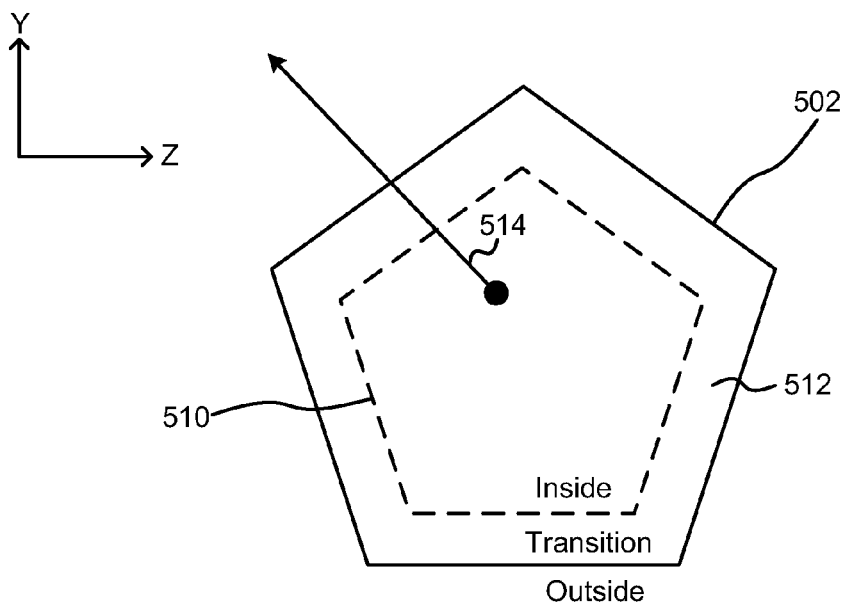

Referring to FIGS. 5A-5B, representations of a volumetric object with a transition zone are shown, according to exemplary embodiments. The method and system described herein may advantageously account for a user's viewpoint as it enters and/or exits a volume. According to an exemplary embodiment, the regional object buffers (e.g., buffers 108 of FIG. 1) store the distance to the entry point and the distance to the exit point of the volume (as described in, e.g., process 330 of FIG. 3B). However, pixel view rays may not always penetrate an entry (exterior) surface or an exit (interior) surface of the volume. As a result, the entry/exit distance may be stored as zero, and the entry/exit polygon's pixel data may not be available to provide color, texture, and other effects. This is shown by view ray 508 of FIG. 5A and view ray 514 of FIG. 5B. View ray 508 shows that a user's viewpoint originates outside of the volume and terminates inside of the volume; the view ray does not penetrate the exit surface. View ray 514 shows that a user's viewpoint originates inside the volume. The entry surface is behind the eye, and view ray 514 does not penetrate the entry surface.

The color, texture, and other effects of the volume when viewed from the inside may be represented and stored as volume state data or provided by the internal surface polygons (which define the exit surface). The volume may defined with specific "internal" characteristics (such as color, density, etc.) that can be used when no entry polygon is valid. Similarly, the color, texture, and other effects of the volume when viewed from the outside may be represented and stored as volume state data or provided by the external surface polygons (which define the entry surface). The volume may defined with specific "external" characteristics (such as color, density, etc.) that can be used when no exit polygon is valid. Steps for advantageously transitioning in a smooth manner, from an outside view (where the exterior surface of the polygon is visible) to an inside view (where it is not) and vice versa may be provided. The transition may be "smooth" in that a user gradually enters and exits a volumetric object. That is, the attributes of the volumetric object fade in or fade out, as opposed to an abrupt appearance/disappearance of the volume attributes. This advantageously represents a more realistic visual transition (e.g., entering or exiting a region of fog). According to an exemplary embodiment, this transition may be completed before the view position actually enters/exits the volume and the outside/inside surfaces are no longer visible.

In FIG. 5A, a transition zone 506 is defined as slightly larger than the volume 502. Transition zone 506 may be referred to as a first transition volume. In FIG. 5B, a transition zone 512 is defined as slightly smaller than the volume 502. Transition zone 512 may be referred to as a second transition volume. Within the transition zones, all or some portion of the attributes of the exterior/interior surface of the volume may be applied. In some embodiments, interpolated attributes, which may comprise a portion of the exterior/interior surface attributes and the global attributes, may be applied. The transition zones are bounded by the volume 502, and the boundary 504 (FIG. 5A) and boundary 510 (FIG. 5B). According to an exemplary embodiment, the volume characteristics of an exterior surface of volume 502 may be interpolated to an exterior surface of the transition volume 506 (FIG. 5A). View ray 508, originating from outside of the volume, transitions in to the volume 502 through the first transition volume 506. According to an exemplary embodiment, the characteristics of an interior surface of the volume 502 may be interpolated to an interior surface of the transition volume 512 (FIG. 5B). View ray 514, originating from inside the volume, transitions outside of the volume through the second transition volume 512.

The system and method described herein provides a transition into and out of the volume. This process includes defining a first transition volume and a second transition volume. The process also includes interpolating the volume characteristics of an exterior surface of the volume to an exterior surface of the first transition volume. The process also includes interpolating the volume characteristics of an interior surface of the volume to an interior surface of the second transition volume. A view ray originating from outside of the volume may transition into the volume through the first transition volume. A view ray originating from inside the volume may transition outside of the volume through the second transition volume.

In FIG. 5A, by defining a transition region slightly larger than the volume, it is possible to smoothly transition between the entry polygons attributes (outside) to the volume's attributes (inside) as the viewer's position moves through the transition zone 506. In FIG. 5B, by defining the transition region slightly smaller than the volume, it is possible to smoothly transition between the exit polygon attributes (inside) to the global attributes (outside) as the view's position moves through transition zone 512.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, a special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method of rendering a graphical image containing a volumetric object on an electronic display, the method comprising:
   defining, at a processing circuit, the volumetric object as a volume, wherein the volume comprises a plurality of polygons;
   rendering the volume for a first plurality of pixels of the electronic display, wherein the volume is described by volume characteristics and the first plurality of pixels corresponds to a spatial extent of the volume; and rendering a graphical image for a second plurality of pixels of the electronic display, wherein the graphical image is described by global characteristics, and wherein the second plurality of pixels corresponds to a spatial extent of the visual scene of the graphical image, and wherein when a view ray for at least one of the second plurality of pixels intersects at least one of the first plurality of pixels, the global characteristics and a proportion of the volume characteristics are combined when rendering the graphical image, the proportion defined by an extent of the intersection of the view ray.

2. The method of claim 1, wherein the volume comprises at least one of a convex hull and a concave shape.

3. The method of claim 1, wherein the volume comprises an interior surface and an exterior surface.

4. The method of claim 1, wherein the volume characteristics are stored in a volume buffer.

5. The method of claim 1, wherein the volume characteristics comprise at least one of a color, a density, a texture, a transparency, a location on the electronic display, a location in a three-dimensional space, a distance to an entry of the volume, and a distance to an exit of the volume.

6. The method of claim 1, wherein rendering the volume comprises:

recording, for each of the first plurality of pixels, the volume characteristics in a volume buffer, wherein the first plurality of pixels corresponds to a spatial extent of the volume; and providing display data configured to cause the electronic display to display the volume.

7. The method of claim 1, wherein rendering the graphical image comprises:

computing the intersection of the view ray for at least one of the second plurality of pixels with at least one of the first plurality of pixels, wherein the first plurality of pixels corresponds to a spatial extent of the volume and the second plurality of pixels corresponds to a spatial extent of the visual scene of the graphical image;

computing an extent of the intersection;

computing the proportion of the volume characteristics to apply to at least one of the second plurality of pixels;

combining the proportion of the volume characteristics and the global characteristics; and providing display data configured to cause the electronic display to display the graphical image containing the volumetric object.

8. The method of claim 1, further comprising:

rendering a plurality of volumes, when the graphical image contains a plurality of volumetric objects, wherein the volume characteristics of the plurality of volumes are stored in a plurality of volume buffers.

9. The method of claim 8, wherein the volume characteristics for each of the plurality of volumes are stored in a different volume buffer, when the plurality of volumes are separated by a depth in three-dimensional space.

10. The method of claim 8, further comprising:

combining the volume characteristics of the plurality of volumes when at least one of the first plurality of pixels contains a plurality of volumes.

11. The method of claim 9, wherein the volume characteristics of the nearest volume in three-dimensional space are stored in an initial volume buffer, and the volume characteristics for subsequent volumes are stored sequentially in subsequent volume buffers.

12. The method of claim 8, wherein the volume characteristics of the farthest volume in three-dimensional space are discarded when a maximum number of volume buffers is reached.

13. The method of claim 8, wherein the volume characteristics of the farthest volume are combined with the volume characteristics of the closest volume thereto, when a maximum number of volume buffers is reached.

14. The method of claim 6, wherein rendering a volume further comprises:

reducing aliasing of the edges of the volume, comprising:

identifying vertices of the volume that are tangential to at least one view ray;

moving the identified vertices outward, wherein the at least one view ray intersects the volume through the area created by moving the identified vertices outward.

15. The method of claim 6, wherein rendering a volume further comprises:

providing a transition into and out of the volume, comprising:

defining a first transition volume and a second transition volume;

interpolating the volume characteristics of an exterior surface of the volume to an exterior surface of the first transition volume; and interpolating the volume characteristics of an interior surface of the volume to an interior surface of the second transition volume, wherein a view ray originating from outside of the volume transitions into the volume through the first transition volume, and wherein a view ray originating from inside the volume transitions outside of the volume through the second transition volume.

16. A system for rendering a graphical image containing a volumetric object on an electronic display, the system comprising:

a processing circuit configured to define the object as a volume, wherein the volume comprises a plurality of polygons;

wherein the processing circuit is further configured to render the volume for a first plurality of pixels of the electronic display, wherein the volume is described by first characteristics; and wherein the processing circuit is further configured to render a graphical image for a second plurality of pixels of the electronic display, wherein the graphical image is described by second characteristics, and wherein the first plurality of pixels corresponds to a spatial extent of the volume and the second plurality of pixels corresponds to a spatial extent of the visual scene of the graphical image;

wherein when a ray for at least one of the second plurality of pixels intersects at least one of the first plurality of pixels, the second characteristics and a proportion of the first characteristics are combined when providing the graphical image, the proportion defined by an extent of the intersection of the ray.

17. The system of claim 16, wherein the first characteristics are stored in a volume buffer, and wherein the first characteristics comprise at least one of a color, a density, a texture, a transparency, a location on the electronic display, a location in a three-dimensional space, a distance to an entry of the volume, and a distance to an exit of the volume.

18. The system of claim 16, wherein rendering the volume comprises:
   recording, for each of the first plurality of pixels, the first characteristics in the volume buffer; and
   providing display data configured to cause the electronic display to display the volume.

19. The system of claim 16, wherein rendering the graphical image comprises:
   computing the intersection of the ray for at least one of the second plurality of pixels with at least one of the first plurality of pixels;
   computing an extent of the intersection;
   computing the proportion of the first characteristics to apply to at least one of the second plurality of pixels;
   combining the proportion of the first characteristics and the second characteristics; and
   providing display data configured to cause the electronic display to display the graphical image containing the volumetric object.

20. The system of claim 16, wherein the processing circuit is further configured to render a plurality of volumes, when the graphical image contains a plurality of objects, wherein the first characteristics of the plurality of volumes are combined when at least one of the first plurality of pixels contains a plurality of volumes.

* * * * *